Nov. 6, 1951 — H. L. DALTON — 2,574,250
TRUNNION SUPPORT FOR ATTACHMENTS
Filed July 5, 1949 — 2 SHEETS—SHEET 1
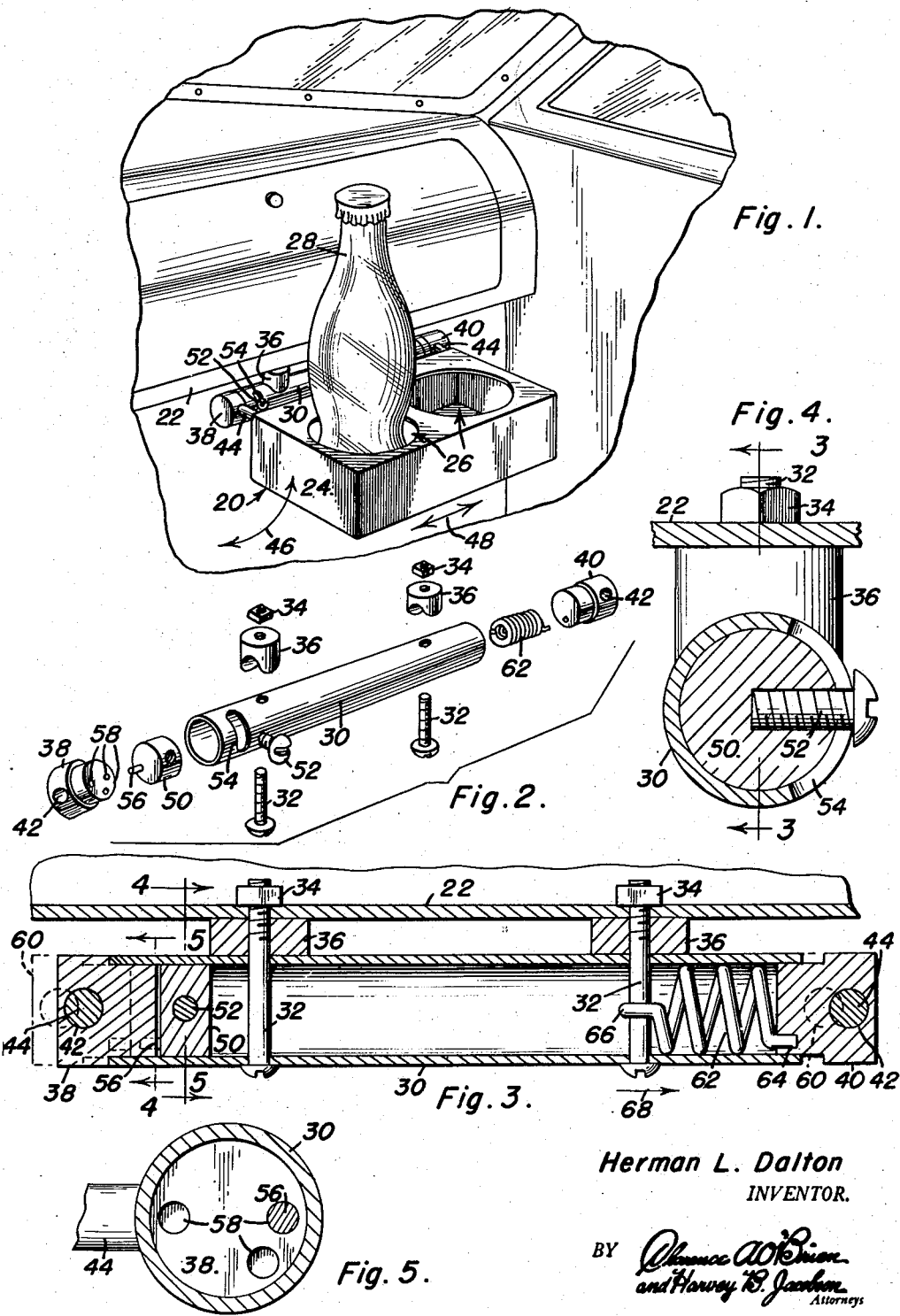
Herman L. Dalton
INVENTOR.

Nov. 6, 1951     H. L. DALTON     2,574,250

TRUNNION SUPPORT FOR ATTACHMENTS

Filed July 5, 1949     2 SHEETS—SHEET 2

Herman L. Dalton
INVENTOR.

BY *Clarence A. O'Brien*
*and Harvey B. Jacobson*
Attorneys

Patented Nov. 6, 1951

2,574,250

UNITED STATES PATENT OFFICE 2,574,250

TRUNNION SUPPORT FOR ATTACHMENTS

Herman L. Dalton, Chattanooga, Tenn., assignor of one-half to Eugene W. Tubbs, Chattanooga, Tenn.

Application July 5, 1949, Serial No. 102,984

2 Claims. (Cl. 16—144)

1

This invention relates to new and useful improvements and structural refinements in article holding attachments, and the principal object of the invention is to facilitate convenient supporting of bottles, cups, glasses, or the like, on instrument panels of automobiles.

This object is achieved by the provision of the instant attachment which is adapted for mounting on the bottom edge portion of the automobile instrument panel and includes a carrier for such articles as may be supported thereby, an important feature of the invention residing in the provision of means for swinging the carrier out of the way under or behind the instrument panel, when it is not in use.

Some of the advantages of the invention lie in its simplicity of construction, in its pleasing appearance, in its convenient operation, and in its adaptablity to economical manufacture and to installation on automobiles of different types.

With the above more important objects and features in view and such other objects and features as may become apparent as this specification proceeds, the invention consists essentially of the arrangement and construction of parts as illustrated in the accompanying drawings, in which:

Figure 1 is a fragmentary perspective view illustrating an automobile instrument panel and the invention in situ thereon;

Figure 2 is a group perspective view of the supporting means used in the invention;

Figure 3 is a longitudinal cross sectional view of the supporting means attached to the instrument panel;

Figure 4 is a fragmentary cross sectional detail, taken substantially on the plane of the line 4—4 in Figure 3;

Figure 5 is a cross sectional view, taken substantially on the plane of the line 5—5 in Figure 3;

Like characters of reference are employed to designate like parts in the specification and throughout the several views.

Figure 6:
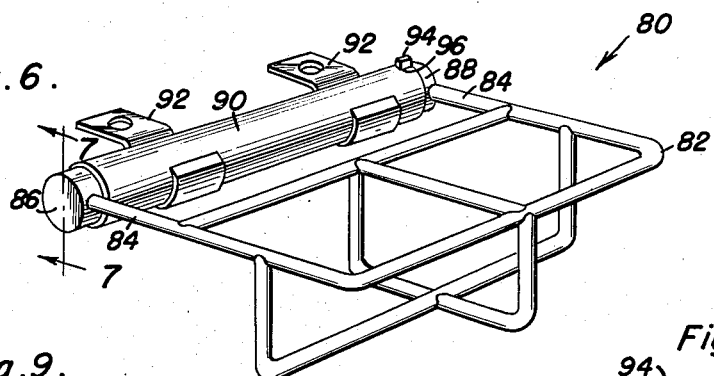
Figure 6 is a perspective view of a modified embodiment of the invention.
Figure 9:
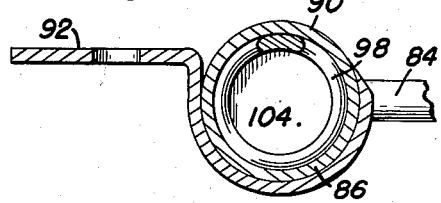
Figure 9 is a cross sectional view, taken substantially on the plane of the line 9—9 in Figure 7.
Figure 8:
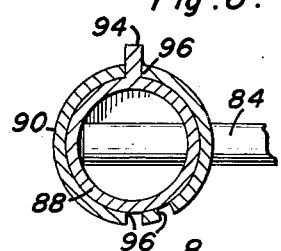
Figure 8 is a cross sectional view, taken substantially on the plane of the line 8—8 in Figure 7.
Figure 7:
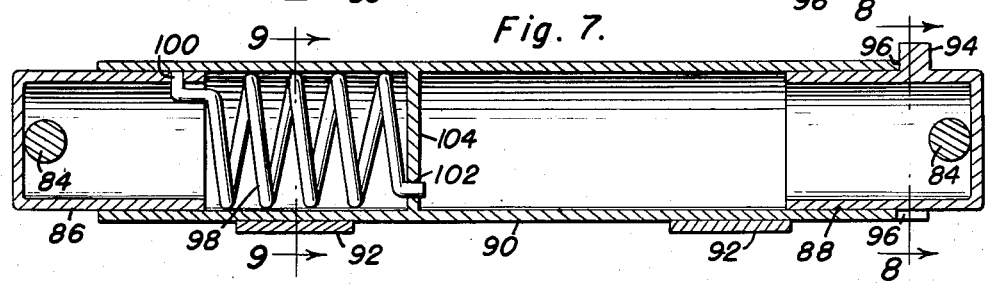
Figure 7 is a cross sectional view, taken substantially on the plane of the line 7—7 in Figure 6.

Referring now to the accompanying drawings in detail, more particularly to Figures 1-5 thereof, the invention consists of an article holding attachment designated generally by the reference character 20, this being primarily intended for mounting on the lower edge or flange of an automobile instrument panel 22, as will be presently described.

The attachment 20 embodies in its construction an article carrier 24 which is preferably provided with a plurality of recesses or compartments 26 to receive suitable bottles, glasses, or the like, as indicated at 28.

A substantially tubular, stationary bearing member 30 is secured by a set of screws and nuts 32, 34, respectively, to the bottom flange of the instrument panel 22, the screws 32 extending transversely through the bearing member 30 and suitable spacers 36 being interposed between the bearing member and the lower flange of the instrument panel 22, substantially as shown.

A pair of elements, which may hereinafter referred to as trunnions 38, 40 are slidable as well as rotatable in the end portions of the stationary bearing member 30, these trunnions projecting outwardly from the bearing member and their projecting portions being provided with transverse apertures or bores 42 to receive supporting rods 44 which project from the article carrier 24 and are rigidly secured in the bores 42 by any suitable means.

It will be apparent from the foregoing that by virtue of this arrangement, the article carrier 24 may be swung or rotated about the longitudinal axis of the bearing member 30 as indicated by the arrows 46 in Figure 1, and in addition, the article carrier 24 together with the trunnions 38, 40 may be slid or shifted longitudinally of the bearing member 30, as indicated at 48.

Accordingly, the article carrier may assume the extended or projected position shown in Figure 1 wherein the bottles, glasses, etc., may be applied thereto, or alternatively, the carrier may be swung rearwardly to a position behind the instrument panel 22, when the use thereof is not desired. Means are provided for supporting or retaining the article carrier in either of the predetermined positions, these means involving the provision of a disk-shaped locking element 50 which is rotatably positioned in one end portion of the bearing member 30 and, for purposes of adjustment, is provided with a set screw or locking screw 52 which, in turn, is adjustable within the limits of an arcuate slot 54 with which the bearing member 30 is formed.

A locking dog 56 projects from one face of the locking element 50 and is receivable selectively in a plurality of blind apertures or bores 58 with which one of the trunnions, namely, the trunnion 38 is provided, so that if it is to be assumed that the element 50 is stationary within the member 30, the entire carrier 24, including the trunnions 38, 40 may be slid to one side so that the locking dog 56 is received in one of the bores 58, thus supporting the entire carrier 24 in readiness for use, as shown in Figure 1. However, by sliding the carrier in a relatively opposite direction, the dog 56 may be disengaged from that particular bore or aperture 58, whereupon the carrier may be swung rearwardly and then slid back so that the locking dog engages another aperture or bore to support the carrier in a position behind the instrument panel. A plurality of the apertures or bores 58 are provided in the trunnion 38 so as to assure that the article carrier may be swung sufficiently behind the instrument panel to be "out of the way" but at the same time, so that the carrier does not interfere with equipment usually occupying the space behind the instrument panel, such as for example, the glove compartment, or the like.

For illustrative purposes, the dotted lines 60 illustrate the positions of the trunnions 38, 40 when the carrier is shifted so as to disengage the locking dog 56 from the apertures 58, as illustrated in Figure 3.

The adjustment facilitated by the movability of the locking screw 52 in the slot 54 affords means for presetting the entire attachment so that the carrier 24 is substantially horizontal when in the position shown in Figure 1, that is to say, by adjusting the screw 52 in the slot 54, the element 50 may be rotated in the bearing member 30 so as to vary the relationship of the locking dog 56 with respect to the aperture 58 and, consequently, to permit the carrier 24 to remain horizontal in its projected position, regardless of the inclination which the bottom edge portion or flange of the instrument panel 22 may assume on different types of automobiles.

Means are also provided for urging the carrier 24 so as to engage the dog 56 with the locking apertures or bores 58, these means consisting of a helical spring 62 which is positioned in the stationary bearing member 30 and has one end portion thereof anchored in an aperture 64 provided in the trunnion 40 (see Figure 3) while the remaining end portion of the spring is anchored to the adjacent of the screws 32, as indicated at 66. It will be readily apparent that the spring 62, by exerting pressure against the trunnion 40 in the direction of the arrow 68, will urge the locking dog 56 into the recesses 58, thus locking the article carrier in a predetermined position, as has been already described.

The modified embodiment of the invention illustrated in the accompanying Figures 6-9 inclusively is somewhat similar but simpler in construction, this modified embodiment being designated by the general reference character 80, the same consisting of a "wire basket" type article carrier 82 provided with supporting rods 84 which, in turn, are secured to a pair of trunnions 86, 88, rotatable and slidable in the end portion of a stationary, substantially tubular bearing member 90. The latter is provided with a set of suitable brackets 92 whereby it may be conveniently secured to the lower edge portion of an automobile instrument panel, and the means for locking the article carrier in its predetermined position assume the form of a locking dog 94 which is provided on the trunnion 88 and is selectively receivable in a plurality of notches or slots 96 formed in one end portion of the bearing member 90.

A helical spring 98 is positioned in the member 90 and has one end thereof anchored to the trunnion 86 as at 100, while the remaining end of this spring is anchored as at 102 in a transverse partition 104 provided intermediate the ends of the bearing member 90.

Figure 10:
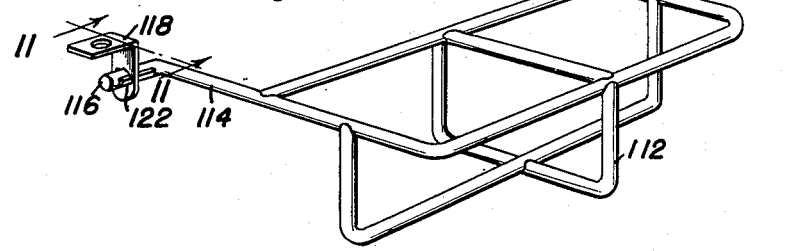
Figure 10 is a perspective view of a further modified embodiment of the invention.
Figure 11:
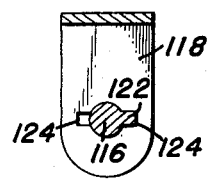
Figure 11 is a cross sectional detail, taken substantially on the plane of the line 11—11 of Figure 10.

Referring now to the further modified embodiment of the invention illustrated in the accompanying Figures 10 and 11 and designated generally by the reference character 110, this last mentioned embodiment is marked by its extreme simplicity, consisting merely of an article carrier 112, similar to the carrier 82, which has the supporting rods 114 thereof angulated in opposite directions so as to provide a pair of trunnions 116 which are rotatable and slidable in a pair of spaced bearing brackets 118, 120 secured to the instrument panel.

One of the trunnions 116 is provided with a locking dog 122 which is selectively receivable in a plurality of notches or slots 124 with which the bracket 118 is formed, while a helical spring 126 is positioned on the remaining trunnion for urging the dog 122 into the recesses or notches 124, as will be clearly apparent.

It is to be observed that in this embodiment the spring 126 performs only one function, namely, that of urging the locking dog into the recesses as aforesaid, while in the embodiments 20 and 80, the respective springs 62 and 98 perform dual functions, that is, urging the dogs to their locked positions, as well as tending to swing the respective carriers 24, 82 to their projected positions as shown in Figures 1 and 6. That is to say, since both ends of the springs 62, 98 are anchored, the springs will be subjected to axial twisting when the carrier is swung under or behind the instrument panel, so that when the carriers are subsequently shifted so as to unlock the locking dogs from their respective recesses, the respective springs will tend to automatically return the carriers to their projected positions, as will be clearly understood.

While the invention is primarily intended for use on instrument panels of automobiles, it may obviously be also employed in aeroplanes, boats, trains and other vehicles, as well as an attachment for card tables, desks, counters, and the like.

It is believed that the advantages and use of the invention will be readily apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a device of the type described, a substantially tubular bearing and support member having open outer ends, means for securing the tubular member to a supporting wall, a pair of trunnions closing the open ends of said bearing member and rotatably and slidably supported thereby, means secured to said trunnions and connecting the same for simultaneous rotative and sliding movement with respect to said tubular member, a locking element rotatably received in and adjustably secured within said tubular member and in juxtaposition to one of said trunnions, a pin projecting from the outer face of said locking element, and a plurality of locking recesses provided in said one trunnion, said pin being adapted to be selectively positioned in a preselected recess thereby adjustably positioning the trunnions and the means connecting the trunnions in predetermined positions relative to the tubular bearing and support member.

2. In a device of the type described, a substantially tubular bearing and support member having open outer ends, means for securing the tubular member to a supporting wall, a pair of trunnions closing the open ends of said bearing member and rotatably and slidably supported thereby, means secured to said trunnions and connecting the same for simultaneous rotative and sliding movement with respect to said tubular member, a locking element rotatably received in and adjustably secured within said tubular member and in juxtaposition to one of said trunnions, a pin projecting from the outer face of said locking element, and a plurality of locking recesses provided in said one trunnion, said pin being adapted to be selectively positioned in a preselected recess thereby adjustably positioning the trunnions and the means connecting the trunnions in predetermined positions relative to the tubular bearing and support member, and resilient means disposed within said tubular member and engaging the other of said trunnions for normally resiliently urging said one trunnion into engagement with said pin.

HERMAN L. DALTON.

REFERENCES CITED

The following references are of record in the file of this patent:

UNITED STATES PATENTS

| Number | Name | Date |
| --- | --- | --- |
| 841,333 | Madden | Jan. 15, 1907 |
| 1,533,661 | Remillong | Apr. 14, 1925 |
| 1,719,922 | Chapman | July 9, 1929 |
| 1,781,545 | Groenenstein | Nov. 11, 1930 |
| 1,890,577 | Flake | Dec. 13, 1932 |
| 1,900,325 | Bayman et al. | Mar. 7, 1933 |
| 2,270,948 | Howe | Jan. 27, 1942 |
| 2,488,688 | Simmons | Nov. 22, 1949 |
| 2,529,801 | Fisk | Nov. 14, 1950 |